United States Patent

Upmeier

[11] 3,898,028
[45] Aug. 5, 1975

[54] APPARATUS FOR COOLING PLASTICS MATERIAL TUBING MADE BY A BLOW HEAD

[75] Inventor: Hartmut Upmeier, Tecklenburg, Germany

[73] Assignee: Windmoller & Holscher, Lengerich, Germany

[22] Filed: Dec. 13, 1973

[21] Appl. No.: 424,228

[30] Foreign Application Priority Data
Dec. 19, 1972 Germany............................ 2262190

[52] U.S. Cl. ............................................... 425/326
[51] Int. Cl. ............................................... B29f 3/00
[58] Field of Search ............ 425/66, 72, 73, 74, 326

[56] References Cited
UNITED STATES PATENTS

| | | | |
|---|---|---|---|
| 2,641,022 | 6/1953 | Kress | 425/326 X |
| 2,966,700 | 1/1961 | Dyer et al. | 425/326 X |
| 3,170,011 | 2/1965 | Cheney et al. | 425/326 X |
| 3,762,853 | 10/1973 | Upmeier | 425/326 |

*Primary Examiner*—J. Howard Flint, Jr.
*Attorney, Agent, or Firm*—Fleit & Jacobson

[57] ABSTRACT

The apparatus serves for air cooling and provides for an exchange of the internal cooling air through a central opening of the blow head. Air supply rings having outlet slots facing the tubing as well as air-guiding surfaces of small axial length are provided inside the tubing and spaced from the annular die orifice and serve to support the tubing. The cooling air supply rings have axially directed passages for the flow of the cooling air discharged by the lower cooling air supply rings.

6 Claims, 1 Drawing Figure

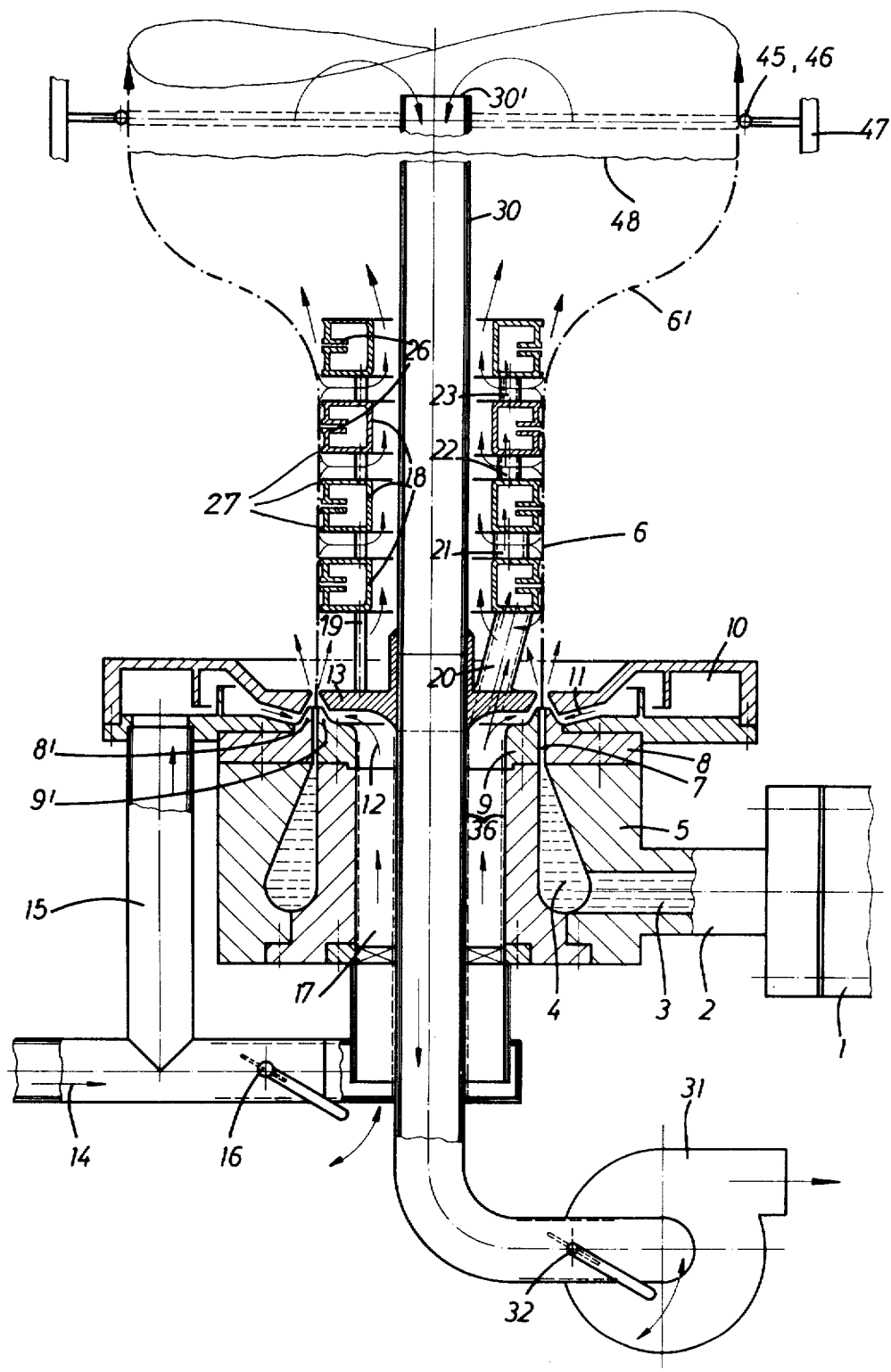

APPARATUS FOR COOLING PLASTICS MATERIAL TUBING MADE BY A BLOW HEAD

This invention relates to an apparatus for cooling plastics material tubing made by a blow head, which apparatus serves for cooling with air and provides for an exchange of the internal cooling air through a central opening of the blow head.

In the manufacture of tubing from synthetic thermoplastics it has been found that the tubing can be cooled to much greater advantage with air than with water. Whereas water cooling is more effective, it is so abrupt as to result in a tubing having unbalanced and undesired properties.

On the other hand, air cooling has a main disadvantage residing in a low cooling capacity. For this reason, known cooling apparatus of the kind defined first hereinbefore are suitable only for operations in which the tubing is taken away at relatively low speed so that only a relatively low cooling capacity is required. It is not possible to increase the cooling capacity of the known plants by a circulation of the cooling air at a higher rate because an increase in cooling capacity by an increase of the air rate involves certain disadvantages. These include, e.g., a constriction of the neck of the tubing by the air jet or a fluttering of the tubing when it is still in a plastic state. It has been proposed to increase the cooling capacity by combining the external cooling of the tubing with a simultaneous cooling inside the tubing. Whereas air coolers which are inserted into the blown tubing and provided with a blower for circulating the enclosed air have resulted in a certain increase in cooling capacity, they have also resulted in considerable disadvantages, which reside in the condensation of the evaporating components of the molten material. An important progress has been achieved by the apparatus which have been disclosed and/or proposed by the applicants and serve for an internal cooling of tubing with an exchange of air through a large central opening of the laterally fed blow head. Such apparatus have been described in the Opened German No. 1,729,130 and the Opened German No. 2,008,587. But even these internal cooling apparatus are limited in cooling capacity because an attempt to increase the cooling capacity by an increase of the air velocities and air rates results finally in an undesired vibration of the tubing when the same is still in a plastic state.

For this reason it is an object of the invention to provide for the cooling of tubing a simple apparatus which ensures a good control of the movement of the tubing and enables an increase in cooling capacity. The invention is based on the recognition that the cooling air which is guided over long distances between the tubing, which is in a plastic state, and a concentric air-guiding surface, which is substantially parallel to the surface of the tubing, promotes the vibration of the tubing, and that the cooling capacity depends on the heat transfer rate, which in turn depends on the velocity of flow of the air.

In a cooling apparatus of the kind described first hereinbefore, this object is accomplished in that cooling air supply rings known per se (see Opened German No. 1,917,521), which have outlet slots facing the tubing and air-guiding surfaces of small axial length, are provided inside the tubing and spaced from the annular die orifice and serve to support the tubing, and that the cooling air supply rings define axially directed passages for the flow of the cooling air discharged from the lower cooling air supply rings. The cooling capacity or the rate at which heat can be removed per unit of time by the cooling air flow depends on the ratio of the surface area to the mass of the tubing and, for this reason, on the ratio of the mean diameter to the wall thickness of the tubing. If the wall thickness is constant, a sufficient cooling capacity will depend on the mean diameter of the tubing and must increase as said diameter decreases. Particularly a tubing which has been blown and taken away at high speed from blow heads which are small in diameter must be cooled with a considerable cooling capacity to provide for the specific cooling capacity which is required to avoid an excessive rise of the freezing limit. The cooling apparatus according to the invention permits of a supply of cooling air at a high rate and a high velocity through any desired number of superimposed pairs of air rings without risk of an intolerable vibration of the tubing when the same is still in a soft plastic state because the cooling air which is supplied is guided only along short distances between the cylindrical air-guiding surfaces and the tubing and cannot excite a detrimental vibration.

The radial supply of cooling air on a plurality of levels to the inside of the blown tubing where the same is in a soft plastic state is effected in accordance with the invention by means of a cylindrical set of annular nozzles. Surprisingly it has been found that this can be accomplished in a reliable manner and with preservation of the stem-and-bowl shape of the blown tubing without need for an external support. The blown tubing assumes a stem-and-bowl shape because it changes suddenly from a cylindrical initial portion, which has approximately the diameter with which the tubing is extruded, to the diameter of the final tubing. This shape is advantageous because the extrusion and the stretching of the material have resulted in a longitudinal orientation and it is desired to reduce this longitudinal orientation by a strong and sudden transverse stretching so that the ratio of the strengths in the longitudinal and transverse strengths is improved. The function of the cooling apparatus according to the invention is ensured although it might be expected that the dynamic blowing pressure which is superimposed on the static internal pressure in the blown tubing coulkd result in an uncontrolled expansion of the externally unsupported blown tubing in the very region in which the tubing material is most highly flowable, immediately after it has emerged from the extruder die. In fact, the tubing retains its cylindrical shape and diameter in that region in which it is still in a soft plastic state and supplied with cooling air. Flowing at a high velocity, the blowing air does not deform the extruded tubing but supports the same with formation of a cooling air cushion, which avoids a contact of the tubing with the cooling rings. The air cushion results in a good lubrication of the extruded tubing with air so that the tubing can be taken away at high speed without risk of tearing off.

Particularly with tubing small in diameter, the supporting force of the tubing even where the same is in a soft plastic state is so large that there is no need for an external support. The tubing which emerges in a soft plastic state from the blow head has the largest wall thickness at the annular die orifice and this wall thickness continuously decreases as the tubing is longitudinally stretched adjacent to the cooling rings. Besides, a plastics material which is in a soft plastic state and subjected to a sudden deformation tends to return to the shape it had before the deformation. For this reason, the tubing tends to constrict. As a result, the tubing tends to contract toward its center as it moves past the cooling rings. Owing to the large initial wall thickness of the tubing and its tendency to constrict, the dimensional stability of the just extruded tubing is so large that even without an external support the tubing resists the blowing pressure, which is superimposed on the internal pressure. Only when the stretching of the material has reduced the wall thickness below a certain limit is its resistance of the material to deformation reduced too and is the tubing quickly expanded by the internal air pressure until in spite of the lower wall thickness the solidification of the tubing increases the resistance to deformation of the tubing to such a degree that the tubing resists the internal air pressure. For this reason the cooling apparatus according to the invention permits of an excellent stretching of the extruded tubing. The blowing air emerging from the cooling ring slots produces a cooling air cushion, which extracts heat at the required rate from the tubing and guides the same without friction.

A special advantage of the cooling apparatus according to the invention is due to the absence of means for externally supporting the tubing and resides in that the extruded tubing can be moved over the cooling rings in a simple manner so that a simple starting of the plant is ensured.

For a given velocity of the blowing air, the rate at which heat can be removed from the tubing increases as the diameter of the tubing increases and as its wall thickness decreases. For this reason, the cooling air supply rings are preferably at least as large in diameter as the annular die orifice. According to a preferred feature, the cooling air supply rings are larger in diameter than the annular die orifice.

The cylindrical air-guiding surfaces may be provided at their edges with annular beads, which face the tubing. As a result of this profiled shape of that surface of the air supply rings which faces the tubing, the cooling air is repeatedly caused to flow over a short distance at high speed past the tubing very close to the same so that the tubing is particularly intensely cooled. Besides, the annular beads define an annular space in which a higher pressure builds up, which promotes the action of the air cushions to support the tubing.

An illustrative embodiment of the invention will be explained more fully hereinafter with reference to the drawing which shows a part-sectional side elevation of a blow head in accordance with the teachings of the present invention.

Molten material is passed from an extruder 1 through a fitting 3 into a manifold 4, shown in simplified form, of a blow head 5 and in an annular orifice 7 formed by die rings 8, 9 is formed into a tubing 6. The orifice 7 is defined by protruding curved lips 8', 9' of the die rings 8, 9. These lips 8', 9' and the initial portion of the tubing 6 are cooled by an air stream 11 emerging from an outer cooling ring 10 and an air stream 12 emerging from an inner air-guiding ring 13. All cooling air 14 is handled by a blower, not shown, and is conducted through a connecting pipe 15 to the external cooling ring and through a damper 16 and an annular passage 17 to the ring 13 for guiding the internal air.

A plurality of vertically spaced apart internal air-guiding rings 18 are provided inside the tubing closely above the blow head and provided with air-guiding lips 26. These rings 18 are carried by the ring 13 and connected thereto, e.g., by rods 19. Cooling air from the air supply passage 17 is supplied to the rings 18 through the connecting pipes 20–23. A plurality of connecting pipes are spaced around the periphery to ensure a uniform supply of air to the air rings. The narrow air outlet gaps, particularly between the die lip 9' and the air-guiding ring 13, ensure a distribution of air to the various air rings. The connecting pipes 20 to 23 decrease in cross-section in the direction of flow to ensure a uniform velocity of flow of the air. Cylindrical air-guiding surfaces of small axial length are provided between the lips 26 and 27 and form narrow air outlet gaps with the tubing.

The blowing air discharged by the several cooling air supply rings is guided in the annular spaces between the inner wall of the upper cooling air-guiding rings and the central tube 30 in the inflated portion of the tubing to the top end 30' of the suction tube.

The air passages extending through the blow head 5 are desirably provided with a heat-insulating layer 36, also the air-guiding rings 18 (this is not shown), in order to prevent a heating of the fresh air by the outflowing warm air.

What is claimed is:

1. In an apparatus for cooling plastics material tubing, made by a blow head of the type having a central air passageway defined therein, a central tube axially aligned within said central passageway and projecting into the tubing being made, an annular die orifice, and at least two axially spaced guide rings positioned inside the tubing being made axially spaced from said annular die orifice and radially surrounding said central tube to define an axially extending annular passageway, the improvement comprising the guide rings being hollow and having axially extending guiding faces on the outer peripheries thereof, an aperture defined in each said guiding face and air feed means to feed air into the hollow interior of said guide rings, which air is directed by said apertures outwardly against the inner surface of the tubing being made and then is guided axially by said axial guide surfaces.

2. The apparatus according to claim 1 comprising the further improvement of axially spaced annular beads positioned on each said guiding face.

3. The apparatus according to claim 1 comprising the further improvement of the air feed means including pipes connecting said guide rings with the pipe diameter being reduced as a function of the spacing from the annular die orifice.

4. In an apparatus for cooling plastics material tubing, made by a blow head of the type having a central air passageway defined therein, a central tube axially defined within said passageway and projecting into the tubing being made, an annular die orifice and at least two axially spaced guide rings positioned inside the tubing axially spaced from said annular die orifice and radially surrounding said central tube to defind an axially extending annular passageway, the improvement comprising the guide rings being hollow and defining apertures in the outer peripheries thereof, axially extending guiding faces defined on the outer periphery of each said guide ring positioned above and below said aperature and means to feed air into the interior of said guide rings so that air fed into each said guide ring is directed against the inner surface of tubing being made by said aperture and then is guided axially by said axial guide surfaces in both directions.

5. The apparatus according to claim 4 comprising the further improvement of axially spaced annular beads formed on each said guide surface.

6. The apparatus according to claim 4 comprising the further improvement of said means to feed air including pipes having decreasing diameters as a function of axial spacing from said annular die orifice.

* * * * *